(12) United States Patent
Murata et al.

(10) Patent No.: US 8,790,813 B2
(45) Date of Patent: Jul. 29, 2014

(54) ELECTRIC STORAGE APPARATUS

(75) Inventors: Takashi Murata, Toyota (JP); Masashi Hirano, Toyota (JP); Takanori Kanamori, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/390,865

(22) PCT Filed: Aug. 21, 2009

(86) PCT No.: PCT/JP2009/004027
§ 371 (c)(1),
(2), (4) Date: Feb. 16, 2012

(87) PCT Pub. No.: WO2011/021253
PCT Pub. Date: Feb. 24, 2011

(65) Prior Publication Data
US 2012/0148903 A1    Jun. 14, 2012

(51) Int. Cl.
*H01M 10/02* (2006.01)
*H01M 2/04* (2006.01)
*H01G 9/155* (2006.01)
*H01M 2/00* (2006.01)

(52) U.S. Cl.
USPC .......... 429/156; 429/151; 429/153; 429/163; 429/164; 361/502

(58) Field of Classification Search
None
See application file for complete search history.

(56) References Cited

U.S. PATENT DOCUMENTS 6,174,618 B1    1/2001    Nishiyama et al.

| | | |
|---|---|---|
| 2001/0031392 A1 | 10/2001 | Ogata et al. |
| 2006/0093899 A1 | 5/2006 | Jeon et al. |
| 2007/0259263 A1 | 11/2007 | Shibuya et al. |

FOREIGN PATENT DOCUMENTS

| CN | 101036250 A | 9/2007 | |
|---|---|---|---|
| EP | 1030387 A1 | 8/2000 | |
| JP | 11-111248 * | 4/1999 | ............ H01M 2/10 |
| JP | 11-111248 A | 4/1999 | |
| JP | 2001-185102 A | 7/2001 | |
| JP | 2001-256934 A | 9/2001 | |
| JP | 2001-297740 A | 10/2001 | |
| JP | 2003-308816 A | 10/2003 | |
| JP | 2005-019087 A | 1/2005 | |
| JP | 2006-128122 A | 5/2006 | |
| JP | 2006-134853 A | 5/2006 | |
| JP | 2009-032550 A | 2/2009 | |

OTHER PUBLICATIONS

Translation of International Preliminary Report on Patentability issued in corresponding International Patent Application No. PCT/JP2009/004027.

* cited by examiner

*Primary Examiner* — Barbara Gilliam
*Assistant Examiner* — Angela Martin
(74) *Attorney, Agent, or Firm* — Sughrue Mion, PLLC

(57) ABSTRACT

An electric storage apparatus includes a plurality of electric storage components, and a holder holding each of the electric storage components at both end portions of each of the electric storage components in a longitudinal direction. The holder includes a plurality of guide portions provided within an orthogonal plane orthogonal to the longitudinal direction of the electric storage component and configured to move both end portions of each of the electric storage components toward a predetermined holding position, and an opening portion formed at one end of each of the guide portions and configured to insert the end portion of the electric storage component into the guide portion.

6 Claims, 12 Drawing Sheets

HEAT EXCHANGE MEDIUM

ELECTRIC STORAGE APPARATUS

CROSS REFERENCE TO RELATED APPLICATIONS

This application is a National Stage of International Application No. PCT/JP2009/004027 filed Aug. 21, 2009, the contents of all of which are incorporated herein by reference in their entirety.

TECHNICAL FIELD

The present invention relates to a structure, in an electric storage apparatus including a plurality of electric storage components electrically and mechanically connected to each other, for allowing removal of an arbitrary one of the electric storage components.

BACKGROUND ART

A battery pack is mounted on a hybrid vehicle as a power source for running of a vehicle in addition to an engine. The battery pack has a plurality of cells connected electrically in series and a battery holder holding the plurality of cells (see, for example, Patent Document 1).

PRIOR ART DOCUMENT

Patent Document

Patent Document 1: Japanese Patent Laid-Open No 2006-134853 (FIG. 4 and the like)

DISCLOSURE OF THE INVENTION

Problems to be Solved by the Invention

Since the plurality of cells are fixed to the battery holder in such a conventional battery pack, the whole battery pack may need to be replaced when one of the cells is deteriorated. In this case, the cells which are not deteriorated are inevitably replaced.

It is thus an object of the present invention to provide an electric storage apparatus in which only an arbitrary one of a plurality of electric storage components can be removed.

Means for Solving the Problems

An electric storage apparatus according to the present invention includes a plurality of electric storage components, and a holder holding each of the electric storage components at both end portions of each of the electric storage components in a longitudinal direction thereof. Each of the electric storage components has electrode terminals at the both end portions and a section shape of the electric storage component within a plane (referred to as an orthogonal plane) orthogonal to the longitudinal direction of the electric storage component is formed in a generally circular shape. The holder includes a plurality of guide portions and an opening portion associated with each of the guide portions. The guide portions are provided within the orthogonal plane and cause both end portions of each of the electric storage components to move toward a predetermined holding position. The opening portion is formed at one end of each of the guide portions, and an end portion of the electric storage component can be caused to enter the guide portion through the opening portion. The opening portion of the holder is located above the electric storage component when viewed from the longitudinal direction of the electric storage component.

A cover with plate shape put over the opening portion can be used to prevent the accidental removal of the electric storage component from the guide portion. In a configuration in which the guide portions are placed side by side in a predetermined direction within the orthogonal plane, end portions of at least two of the electric storage components can be inserted into each of the guide portions, and each of the guide portions can be inclined generally 60 degrees with respect to the predetermined direction. This can efficiently bring a heat exchange medium for temperature adjustment into contact with the plurality of electric storage components.

When the plurality of electric storage components having stages for the electrode terminals that have different outer diameters are used, the guide portion can be provided with a first guide region and a second guide region. The first guide region has a width associated with the stage having a larger one of the outer diameters. The second guide region is associated with the stage having a smaller one of the outer diameters, has a width smaller than the width of the first guide region, and is located on one side of the first guide region opposite to the opening portion.

Thus, the stages appropriate for the respective guide regions can be inserted into the first and second regions to prevent erroneous insertion of the electric storage component into the holder.

When a first electric storage component having the stage in contact with the first guide region and a second electric storage component having the stage in contact with the second guide region are used, the first and second electric storage components can be connected electrically in series at end portions on the side opposite to end portions where the stages are provided.

When the electric storage apparatus according to the present invention is mounted on a vehicle, the opening portion can be provided at an end face of the holder that is located on an upper side of the vehicle. Thus, the electric storage component can be removed from or attached to the holder in the state where the electric storage apparatus is mounted on the vehicle, for example.

Effect of the Invention

According to the present invention, the guide portion and the opening portion provided for the holder can be used to insert easily an arbitrary electric storage component to the holding position within the holder or to remove easily the electric storage component from the holding position.

BEST MODE FOR CARRYING OUT THE INVENTION

An embodiment of the present invention will hereinafter be described.

Embodiment 1

Figure 1:
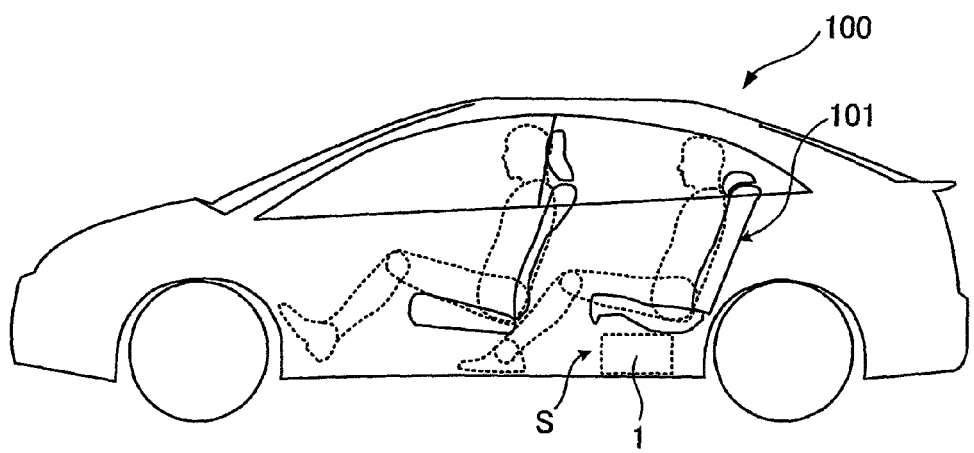
FIG. 1 is a schematic diagram showing a vehicle including a battery pack which is Embodiment 1 of the present invention.

A battery pack which is Embodiment 1 of the present invention will be described. The battery pack according to the present embodiment can be mounted on a vehicle. For example, as shown in FIG. 1, a battery pack 1 can be placed in space S formed under a rear sheet 101 in the interior of a vehicle 100. The position where the battery pack 1 is mounted can be set as appropriate. For example, the battery pack 1 can be placed in a luggage room or a console box in stead of the space S.

Examples of the vehicle 100 on which the battery pack 1 according to the present embodiment is mounted include a hybrid vehicle and an electric vehicle. The hybrid vehicle is a vehicle which employs the battery pack 1 as a power source generating running energy for the vehicle in addition to an engine or a fuel cell. The electric vehicle is a vehicle which employs only the battery pack 1 as the power source of the vehicle.

Figure 2:
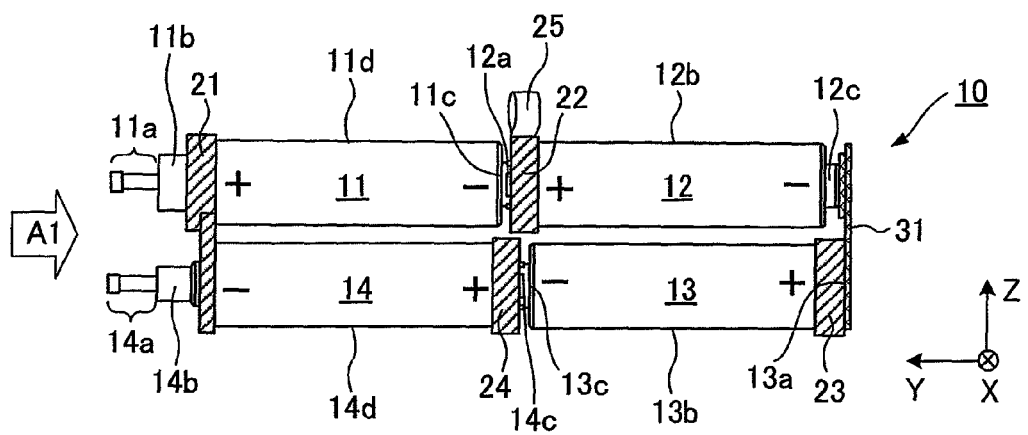
FIG. 2 is an external view showing a battery module used in the battery pack of Embodiment 1.
Figure 3:
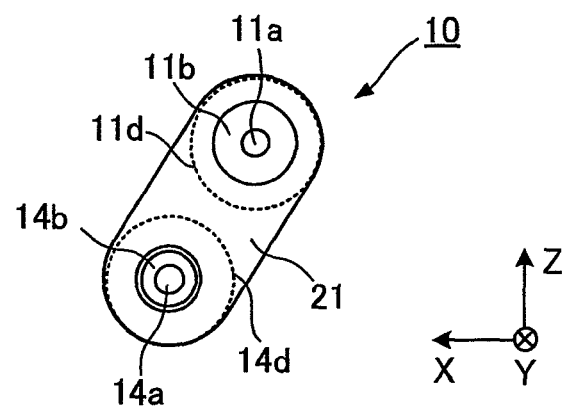
FIG. 3 is a diagram of the battery module in Embodiment 1 viewed from the direction of an arrow A1 in FIG. 2.

The battery pack 1 according to the present embodiment has a battery module 10 shown in FIG. 2 and FIG. 3, and a battery holder 50 (see FIG. 8) holding a plurality of battery modules 10. First, the structure of the battery module 10 will be described.

An X axis, a Y axis, and a Z axis shown in FIG. 2 are orthogonal to each other. In the present embodiment, the X axis corresponds to a left-right direction of the vehicle 100, the Y axis corresponds to a front-back direction (traveling direction) of the vehicle 100, and the Z axis corresponds to an up-down direction of the vehicle 100. The relationship between these axes applies to the other figures.

As shown in FIG. 2, the battery module 10 has four cells 11 to 14 which are connected electrically in series. The two cells 11 and 12 are placed side by side in a longitudinal direction (Y direction) of the cells 11 and 12, and the two cells 13 and 14 are placed side by side in the longitudinal direction (Y direction) of the cells 13 and 14. The line of the cells 11 and 12 and the line of the cells 13 and 14 are placed side by side in a direction orthogonal to the Y direction.

A cylindrical battery is used as each of the cells 11 to 14. A secondary battery such as a nickel metal hydride battery or a lithium-ion battery can be used as each of the cells 11 to 14. Instead of the secondary battery, an electric double layer capacitor (capacitor) can be used. Alternatively, a cell having a different shape from the cylindrical cell can be used.

A positive electrode terminal 11a and a terminal stage 11b are provided at one end of the first cell 11, and a negative electrode terminal 11c is provided at the other end of the first cell 21. As shown in FIG. 3, the positive electrode terminal 11a and the terminal stage 11b are placed concentrically. A battery case 11d of the first cell 11 houses an electric-generating element (not shown) connected electrically to the terminal stage 11b (positive electrode terminal 11a) and the negative electrode terminal 11c.

The electric-generating element is an element for performing charge and discharge and is formed of a positive electrode component, a negative electrode component, and a separator placed between the positive electrode component and the negative electrode component. In the present embodiment, the electric-generating element is formed by wrapping a stack including the positive electrode component, the negative electrode component, and the separator interposed between them around an axis member. The electric-generating element is similarly formed in the other cells 12 to 14.

Figure 4:
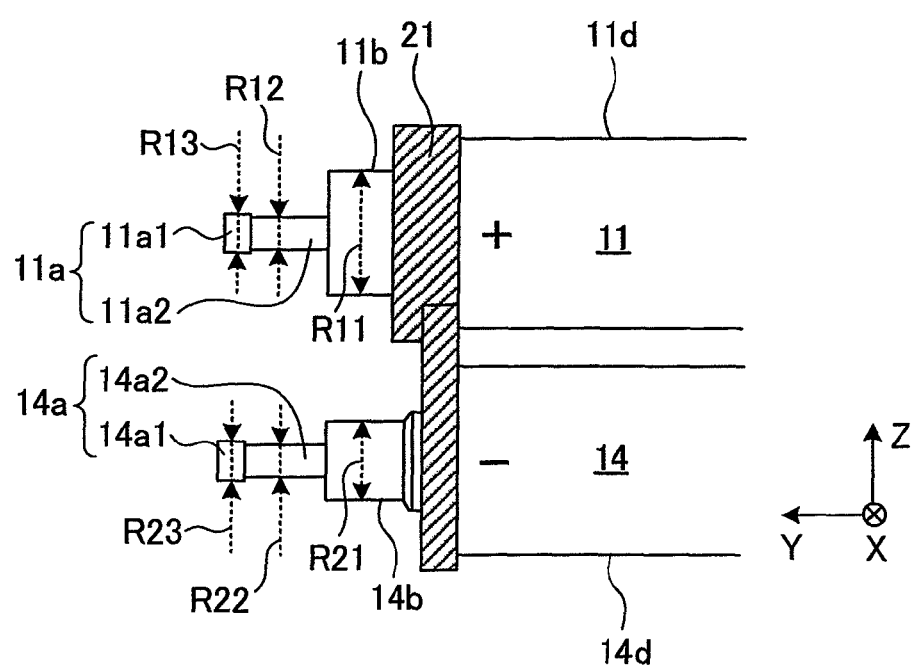
FIG. 4 is a side view showing the structure of a positive electrode terminal and a negative electrode terminal in the battery module in Embodiment 1.

As shown in FIG. 4, an outer diameter R11 of the terminal stage 11b is smaller than an outer diameter of the battery case 11d. The positive electrode terminal 11a has a tip portion 11a1 and a base portion 11a2, and an outer diameter R12 of the base portion 11a2 is smaller than the outer diameter R11 of the terminal stage 11b. An outer diameter R13 of the tip portion 11a1 is smaller than the outer diameter R11 of the terminal stage 11b and is larger than the outer diameter R12 of the base portion 11a2.

A first cap 21 is attached to an end portion of the battery case 11d on the side where the terminal stage 11b is located. The first cap 21 has an opening portion formed therein for passing the positive electrode terminal 11a and the terminal stage 11b therethrough. The first cap 21 is formed of an insulating material such as resin and is elastically deformable. The first cap 21 is used to position the first cell 11 and the fourth cell 14 and is used to accommodate tolerances when the first cell 11 is inserted into the battery holder 50, later described.

The negative electrode terminal 11c of the first cell 11 is fixed in contact with a positive electrode terminal 12a of the second cell 12. This connects the first cell 11 and the second cell 12 electrically in series. The negative electrode terminal 11c and the positive electrode terminal 12a are opposite to each other in the longitudinal direction (Y direction) of the cells 11 and 12.

The positive electrode terminal 12a is provided at one end face of a battery case 12b, and a second cap 22 is attached to the one end face of the battery case 12b. The second cap 22 is formed of an insulating material such as resin and is elastically deformable. The second cap 22 is used to accommodate tolerances when the second cell 12 is inserted into the battery holder 50.

A manipulation ring 25 is provided on the outer peripheral face of the second cap 22 and is used in removing the battery module 10 from the battery holder 50, as later described. A negative electrode terminal 12c is provided at the other end face of the battery case 12b and is fixed to a bus bar (so-called return bus bar) 31. The negative electrode terminal 12c and a positive electrode terminal 13a are located within the plane where the bus bar 31 is placed.

The positive electrode terminal 13a of the third cell 13 is provided at one end face of a battery case 13b and is fixed to the bus bar 31. This connects the second cell 12 and the third cell 13 electrically in series through the bus bar 31. A third cap 23 having an opening portion for passing the positive electrode terminal 13a therethrough is attached to the outer peripheral face of the battery case 13b on the one end side. The third cap 23 is formed of an insulating material such as resin and is elastically deformable. The third cap 23 is used to accommodate tolerances when the third cell 13 is mounted on the battery holder 50.

A negative electrode terminal 13c of the third cell 13 is fixed in contact with a positive electrode terminal 14c of the fourth cell 14. This connects the third cell 13 and the fourth cell 14 electrically in series. The negative electrode terminal 13c and the positive electrode terminal 14c are opposite to each other in the longitudinal direction of the cells 13 and 14.

The positive electrode terminal 14c is provided at one end face of a battery case 14d. A fourth cap 24 having an opening portion for passing the positive electrode terminal 14c therethrough is attached to the outer peripheral face of the battery case 14d on the one end side. The fourth cap 24 is formed of an insulating material such as resin and is elastically deformable. The fourth cap 24 is used to accommodate tolerances when the fourth cell 24 is mounted on the battery holder 50.

A terminal stage 14b is provided at the other end face of the battery case 14d, and a negative electrode terminal 14a is provided on the terminal stage 14b. As shown in FIG. 3, the negative electrode terminal 14a and the terminal stage 14b are placed concentrically. The first cap 21 is attached to the outer peripheral face of the battery case 14d on the side where the terminal stage 14b is provided, and the first cap 21 has an opening portion formed therein for passing the negative electrode terminal 14a and the terminal stage 14b therethrough. The use of the first cap 21 can maintain the interval between the first cell 11 and the fourth cell 14 at a predetermined distance.

As shown in FIG. 4, an outer diameter R21 of the terminal stage 14b is smaller than an outer diameter of the battery case 14d and is smaller than the outer diameter R11 of the terminal stage 11b in the first cell 11. The positive electrode terminal 14a has a tip portion 14a1 and a base portion 14a2, and an outer diameter R22 of the base portion 14a2 is smaller than an outer diameter R21 of the terminal stage 14b. An outer diameter R23 of the tip portion 14a1 is smaller than the outer diameter R21 of the terminal stage 14b and is larger than the outer diameter R22 of the base portion 14a2.

The outer diameter R22 may be identical to or different from the outer diameter R12. The outer diameter R23 may be identical to or different from the outer diameter R13.

Figure 5:
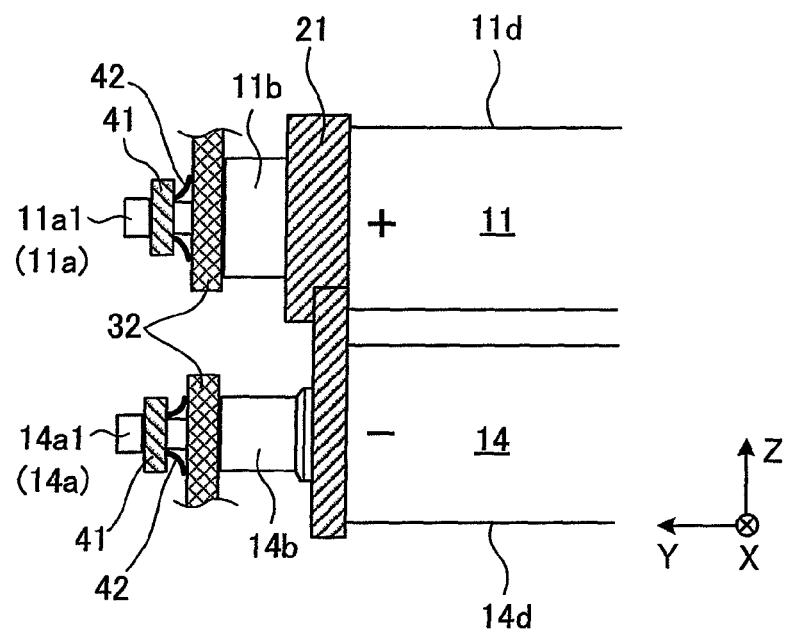
FIG. 5 is a side view showing a structure for connecting an electrode terminal of the battery module and a bus bar in Embodiment 1.

As shown in FIG. 5, a bus bar 32 is connected to the positive electrode terminal 11a of the first cell 11, and the positive electrode terminal 11a is connected electrically to a fourth cell 14 of another battery module 10 through the bus bar 32. The positive electrode terminal 11a serves as the positive electrode terminal of the battery module 10.

The bus bar 32 is connected to the negative electrode terminal 14a of the fourth cell 14, and the negative electrode terminal 14a is connected electrically to a first cell 11 of another battery module 10 through the bus bar 32. The negative electrode terminal 14a serves as the negative electrode terminal of the battery module 10.

The structure for connecting the positive electrode terminal 11a and the bus bar 32 will be described specifically. The description of the structure for connecting the negative electrode terminal 14a and the bus bar 32 is omitted since the structure is similar to the structure for connecting the positive electrode terminal 11a and the bus bar 32.

Figure 6:
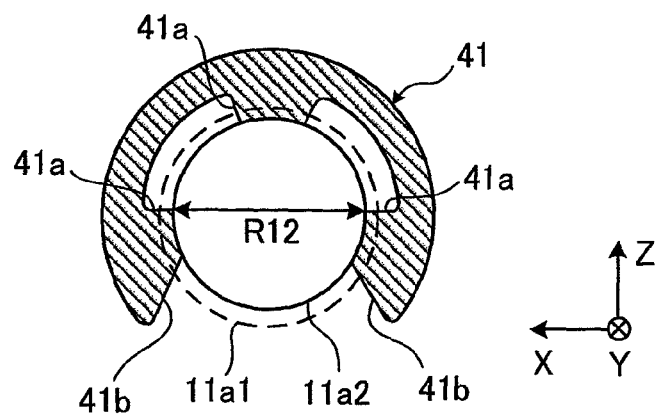
FIG. 6 is a diagram showing a lock ring used in the connecting structure.

In the positive electrode terminal 11a, a lock ring 41 is placed on the outer periphery of the base portion 11a2. As shown in FIG. 6, the lock ring 41 has three protruding portions 41a protruding toward the inside in the diameter direction, and the end of the protruding portion 41a is in contact with the outer peripheral face of the base portion 11a2. Both end portions 41b of the lock ring 41 are spaced in the circumferential direction of the base portion 11a2, and the space formed between the both end portions 41b is used for attaching or removing the lock ring 41 to or from the base portion 11a2.

Figure 7:
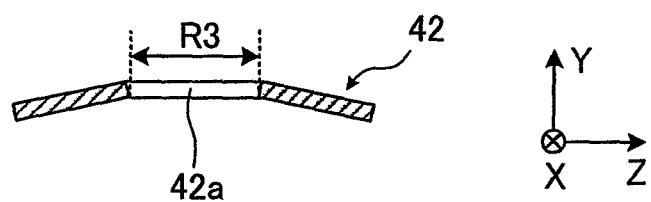
FIG. 7 is a side view showing a Disc spring used in the connecting structure.

A Disc spring 42 is placed between the lock ring 41 and the bus bar 32 in the axis direction (Y direction) of the positive electrode terminal 21a. An inner diameter portion 42a of the Disc spring 42 shown in FIG. 7 allows the base portion 11a2 of the positive electrode terminal 11a to pass therethrough, and a diameter R3 of the inner diameter portion 42a is larger than the outer diameter R12 of the base portion 11a2. The Disc spring 42 has the function of urging the lock ring 41 and the bus bar 32 toward directions in which they move away from each other. This brings the lock ring 41 into contact with the tip portion 11a1 of the positive electrode terminal 11a and brings the bus bar 32 into contact with the terminal stage 11b.

The shape of the lock ring 41 is not limited to that shown in FIG. 6. Specifically, it is required only that the lock ring 41 should be in contact with the Disc spring 42 on the side closer to the tip portion 11a1 of the positive electrode terminal 11a so that the lock ring 41 can undergo the urging force of the Disc spring 42. The lock ring 41 may be omitted to bring the Disc spring 42 into contact with the tip portion 11a1.

In the configuration in which the lock ring 41 and the bus bar 32 are used, the bus bar 32 can be easily attached to the positive electrode terminal 11a. Specifically, the attachment can be performed only by passing the positive electrode terminal 11a through the bus bar 32 and the Disc spring 42, and in this state, sliding and attaching the lock ring 41 to the positive electrode terminal 11a.

The urging force of the Disc spring 42 can be used to bring the lock ring 41 into intimate contact with the tip portion 11a1 and bring the bus bar 32 into intimate contact with the terminal stage 11b. This can lower the contact resistance between the bus bar 32 and the positive electrode terminal 11a and the terminal stage 11b to reduce current loss due to the contact resistance.

Next, the structure of the battery holder 50 for holding the plurality of battery modules 10 will be described specifically.

Figure 8:
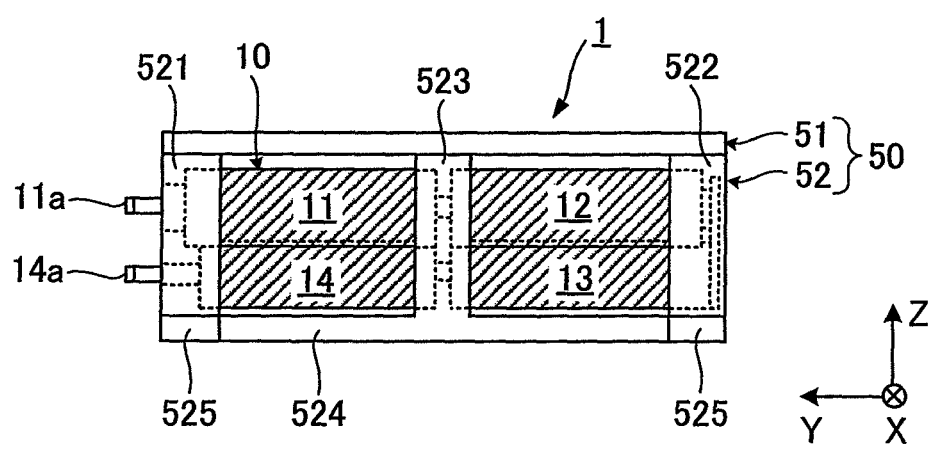
FIG. 8 is a diagram showing the structure of a battery holder holding the battery module in Embodiment 1.

The battery holder 50 is formed of an insulating material such as resin, and holds the battery module 10 as shown in FIG. 8. Specifically, the battery holder 50 holds both ends of each of the cells 11 to 14 constituting the battery module 10.

Figure 9:
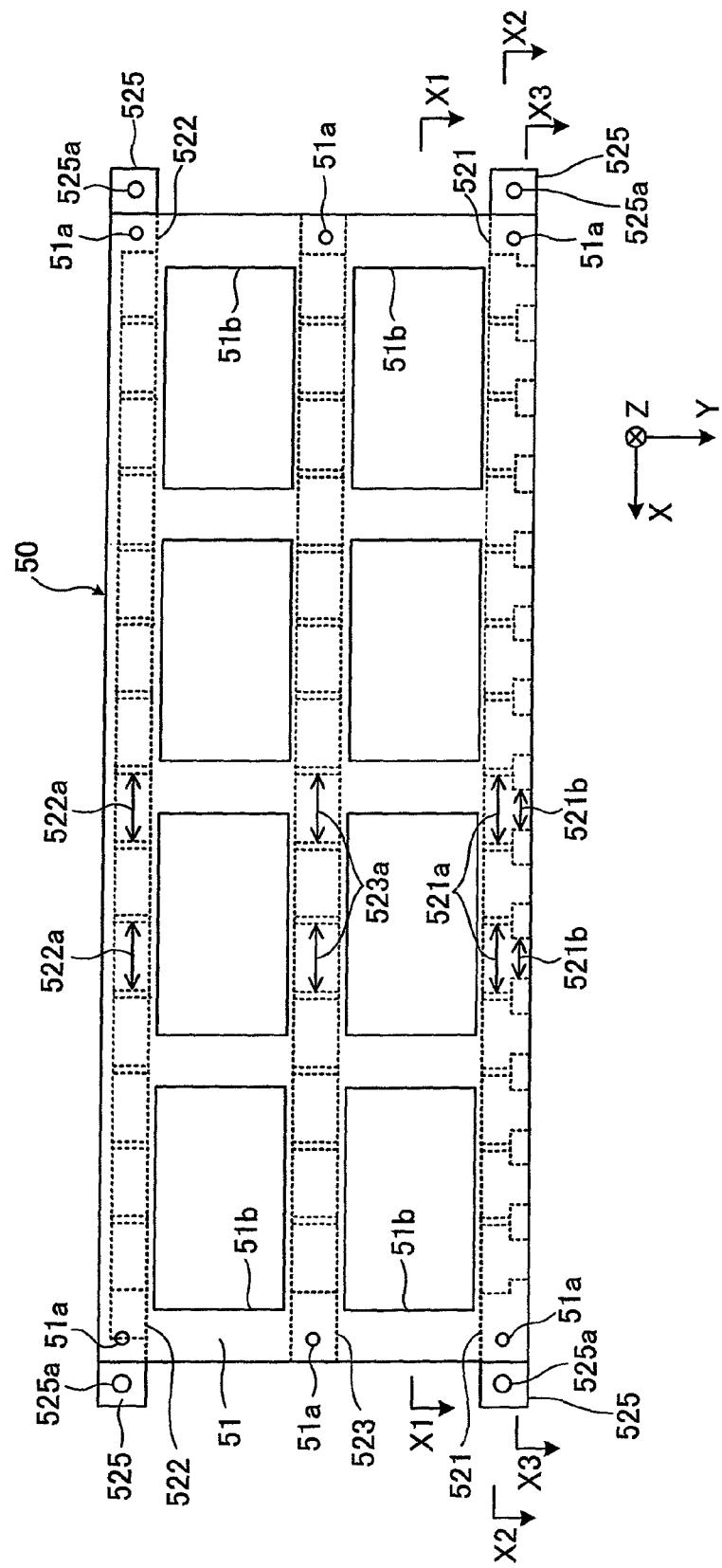
FIG. 9 is a top view showing the structure of the battery holder in Embodiment 1.

The battery holder 50 has a holder cover 51 forming an upper face of the battery holder 50 and a holder body 52 supporting the plurality of battery modules 10. As shown in FIG. 9, the holder cover 51 has fastening holes 51a formed therein, and the holder cover 51 is fixed to the holder body 52 by fastening bolts (not shown) passed through the fastening holes 51a. The holder cover 51 also has a plurality of opening portions 51b formed therein.

As shown in FIG. 8, the holder body 52 has three support portions 521 to 523, a bottom portion 524, and fixing portions 525. The fixing portions 525 have fastening holes 525a (see FIG. 9) formed therein, and the fixing portions 525 are fixed to a body of the vehicle 100 by fastening bolts (not shown) passed through the fastening holes 525a. Examples of the body of the vehicle 100 include a floor panel, a cross member, and a side member. The bottom portion 524 has a plurality of opening portions (not shown) formed therein similarly to the opening portions 51b of the holder cover 51.

Each of the support portions 521 to 523 is located within an X-Z plane and supports part of each of the cells 11 to 14 constituting the battery module 10. The first support portion 521 has guide holes 521a and 521b for guiding one end portion of the battery module 10 in a predetermined direction, and the guide hole 521a and the guide hole 521b communicate with each other. The number of the sets of the guide holes 521a and 521b is the same as the number of the battery modules 10 inserted into the battery holder 50.

The second support portion 522 has guide grooves 522a formed therein for guiding the other end portion of the battery module 10 in a predetermined direction. The number of the guide grooves 522a is the same as the number of the battery modules 10 inserted into the battery holder 50. The connecting portion of the second cell 12 and the third cell 13 is located inside the guide groove 522a.

The battery module 10 does not pass through the second support portion 522, and the bus bar 31 connecting the second cell 12 and the third cell 13 is opposite to the guide groove 522a in the Y direction. In other words, the bus bar 31 is covered with the second support portion 522 and is not exposed to the outside of the battery holder 50. It should be noted that the battery module 10 may pass through the second support portion 522 or that the bus bar 31 may be exposed to the outside of the battery holder 50.

The third support portion 523 has guide holes 523a formed therein for guiding part of the battery module 10 in a predetermined direction. The number of the guide holes 523a is the same as the number of the battery modules 10 inserted into the battery holder 50. The connecting portion of the first cell 11 and the second cell 12 and the connecting portion of the third cell 13 and the fourth cell 14 are located inside the guide hole 523a. The guide hole 523a is in contact with the second cap 22 attached to the second cell 12 and the fourth cap 24 attached to the fourth cell 14.

Figure 10:
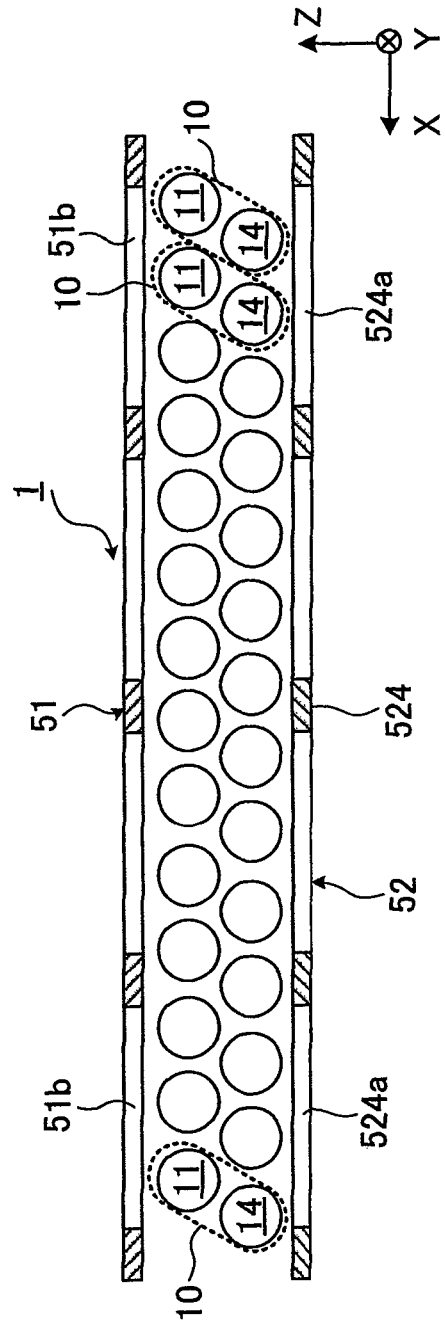
FIG. 10 is a section view showing the battery pack of Embodiment 1 taken along X1-X1 line in FIG. 9.
Figure 11:
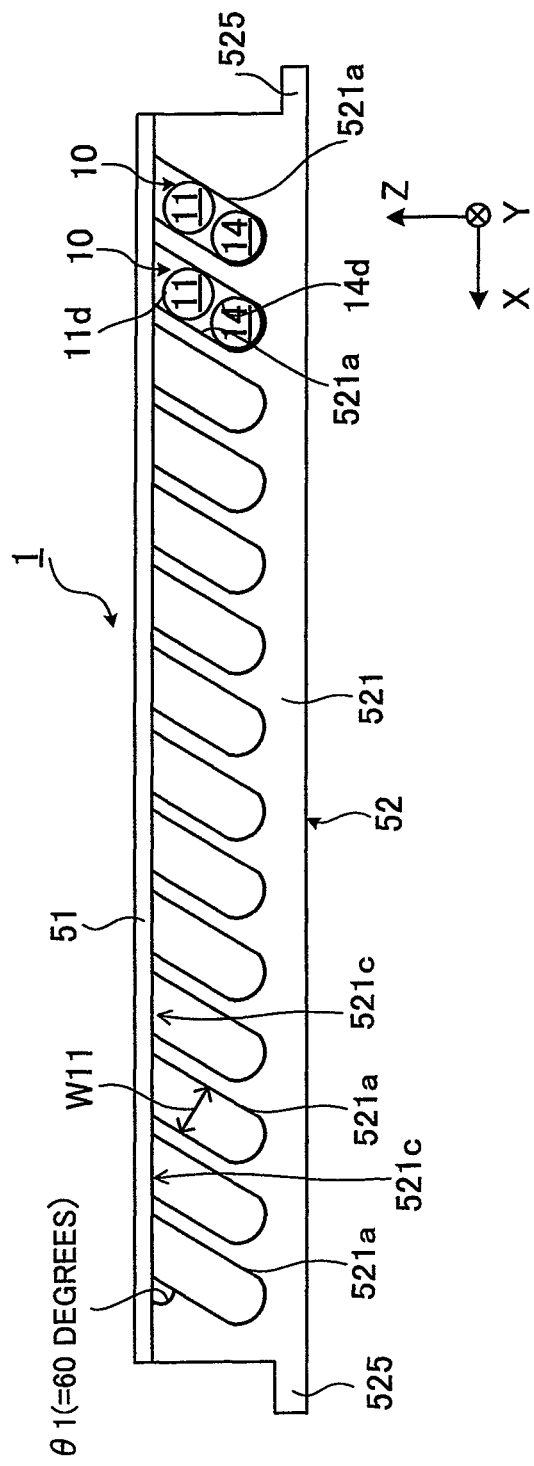
FIG. 11 is a section view showing the battery pack of Embodiment 1 taken along X2-X2 line in FIG. 9.
Figure 12:
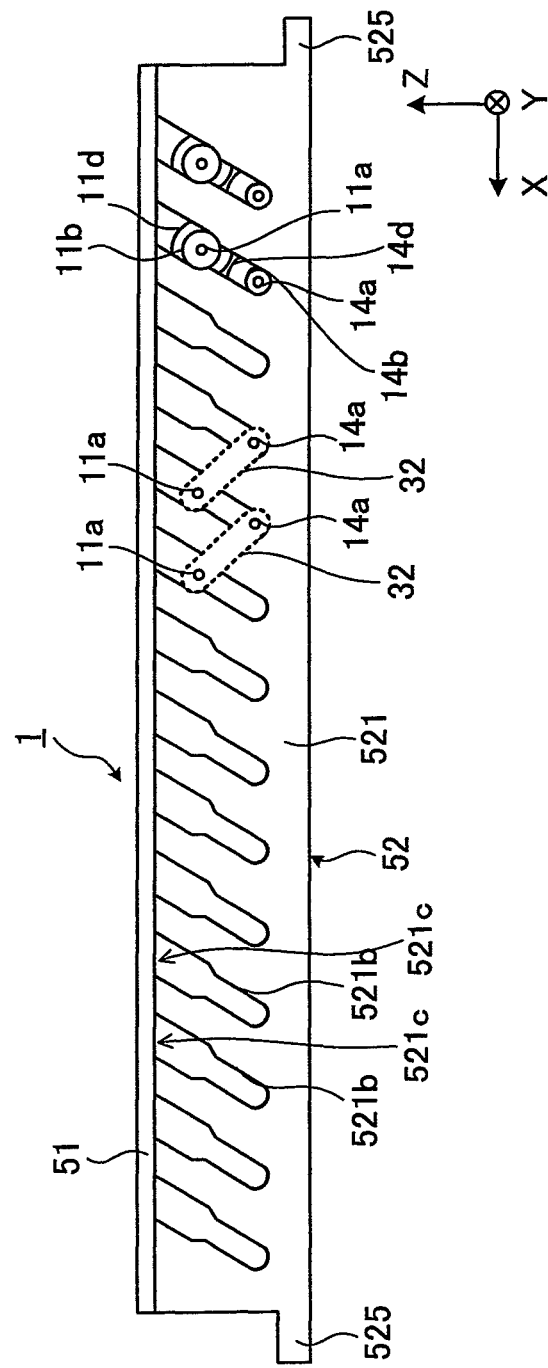
FIG. 12 is a section view showing the battery pack of Embodiment 1 taken along X3-X3 line in FIG. 9.

Next, the structure of the battery holder 50 for holding the battery module 10 will be described specifically. FIG. 10 is a section view taken along X1-X1 in FIG. 9, FIG. 11 is a section view taken along X2-X2 in FIG. 9, and FIG. 12 is a section view taken along X3-X3 in FIG. 9. FIG. 11 and FIG. 12 partially show the battery modules 10.

As shown in FIG. 10, the plurality of battery modules 10 are placed side by side in the X direction, and each of the battery modules 10 is inclined with respect to an X-Y plane. In other words, the plurality of first cells 11 are placed side by side in the X direction, and the plurality of fourth cells 14 are placed side by side in the X direction. Each of the fourth cells 14 is placed at a position where the fourth cell 14 is partially overlapped with the first cell 11 between two adjacent ones of the first cells 11 in the X direction when viewed from the Z direction.

The holder cover 51 has the plurality of opening portions 51b formed therein, and the bottom portion 524 of the holder body 52 also has a plurality of opening portions 524a formed therein. The opening portions 51b and the opening portions 524a are formed in coinciding shapes when viewed from the Z direction.

The interval between the two adjacent first cells 11 (or fourth cells 14) in the X direction can be set as appropriate. The interval between the first cell 11 and the fourth cell 14 included in the battery module 10 can also be set as appropriate. If these intervals are narrowed, the size of the battery pack 1 can be reduced, but a heat exchange medium for temperature adjustment is difficult to flow smoothly between the cells 11 and 14. The position relationship between the second cell 12 and the third cell 13 is similar to the position relationship between the first cell 11 and the fourth cell 14 described above.

The placement of the battery modules 10 as described above can efficiently supply the heat exchange medium for temperature adjustment to all of the cells 11 to 14 constituting the battery modules 10. As the heat exchange medium, gas or insulating liquid can be used. In this case, the battery holder 50 holding the plurality of battery modules 10 can be covered with a case.

When a heat exchange medium for cooling is used, a temperature rise can be suppressed in the battery modules 10. When a heat exchange medium for heating is used, a temperature drop can be suppressed in the battery modules 10.

Figure 13:
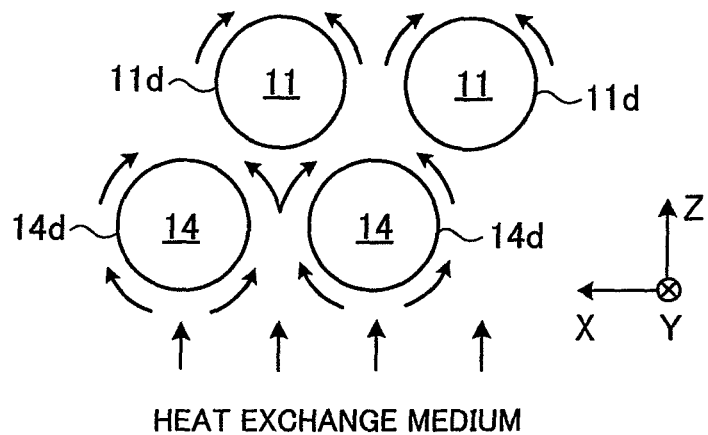
FIG. 13 is a diagram for explaining the moving path of a heat exchange medium used in temperature adjustment of the battery module in Embodiment 1.

As shown in FIG. 13, for example when the heat exchange medium is supplied from the bottom face of the battery pack 1, the heat exchange medium moves along the outer peripheries of the fourth cells 14 and then moves along the outer peripheries of the first cells 11. Arrows shown in FIG. 13 indicate the main moving directions of the heat exchange medium.

If the first cells 11 and the fourth cells 14 are placed in line in the Z direction, the heat exchange medium after the contact with the fourth cells 14 does not easily reach the outer peripheral faces of the first cells 11 (especially the regions opposite to the fourth cells 14). In contrast, according to the present embodiment, the heat exchange medium can be efficiently guided to the outer peripheral faces of the first cells 11 and the fourth cells 14 to allow the efficient temperature adjustment of the cells 11 and 14.

While the heat exchange medium is supplied from the bottom face of the battery pack 1 in the description of FIG. 13, the present invention is not limited thereto. For example, the heat exchange medium can be supplied to the cells 11 and 14 from any one of a left direction, a right direction, and an upper direction in FIG. 13. In this case, the temperature adjustment of the cells 11 and 14 can also be performed efficiently. Since the cells 12 and 13 are placed in the position relationship similar to that of the cells 11 and 14, the heat exchange medium can also be efficiently guided to the cells 12 and 13.

As shown in FIG. 11, the guide hole 521a of the first support portion 521 extends in a predetermined direction in the X-Z plane, and the battery cases 11d and 14d of the cells 11 and 14 are located inside the guide hole 521a. In the present embodiment, the first cap 21 (see FIGS. 2 and 3) of the battery module 10 is in contact with the guide hole 521a. The guide hole 521a extends to the upper end of the first support portion 521, and an opening portion 521c associated with the guide hole 521a is formed at the upper end of the first support portion 521. Thus, the battery module 10 can be inserted into the guide hole 521a from the opening portion 521c.

A width W11 of the guide hole 521a is slightly larger than the diameter of each of the battery cases 11d and 14d. This allows the cells 11 and 14 to be inserted into the guide hole 521a in the state where the first cap 21 attached to the outer peripheral faces of the battery cases 11d and 14d is in intimate contact with the guide hole 521a.

An angle (acute angle) θ1 between the upper end face of the holder body 52 and the guide hole 521a is set to generally 60 degrees in the X-Z plane. The upper end face of the holder body 52 is a face in contact with the holder cover 51. The "generally 60 degrees" means an angle including a mechanical tolerance for 60 degrees. When the battery module 10 is inserted into the holder body 52, the arrangement direction of the cells 11 and 14 is at generally 60 degrees with respect to the X-Y plane. The arrangement direction of the cells 12 and 13 is also at generally 60 degrees with respect to the X-Y plane.

The guide groove 522a (see FIG. 9) of the second support portion 522 is formed to generally coincide with the guide hole 521a of the first support portion 521 when viewed from the Y direction. In other words, the angle (acute angle) between the upper end face of the holder body 52 and the guide groove 522a is generally 60 degrees. The guide groove 522a extends to the upper end of the second support portion 522, and an opening portion (not shown) associated with the guide groove 522a is formed at the upper end of the second support portion 522. Thus, the battery module 10 can be inserted into the guide groove 522a from the opening portion formed at the upper end of the second support portion 522.

The guide hole 523a (see FIG. 9) of the third support portion 523 is formed to generally coincide with the guide hole 521a of the first support portion 521 when viewed from the Y direction. In other words, the angle (acute angle) between the upper end face of the holder body 52 and the guide hole 523a is generally 60 degrees. The guide hole 523a extends to the upper end of the third support portion 523, and an opening portion (not shown) associated with the guide hole 523a is formed at the upper end of the third support portion 523. Thus, the battery module 10 can be inserted into the guide hole 523a from the opening portion formed at the upper end of the third support portion 523.

The guide hole 521b formed integrally with the guide hole 521a shown in FIG. 11 is formed in the first support portion 521. The guide hole 521b is provided for guiding the terminal stages 11b and 14b of the battery module 10 in a predetermined direction. The guide hole 521b extends to the upper end of the first support portion 521, and the opening portion 521c associated with the guide hole 521b (including the guide hole 521a) is formed at the upper end of the first support portion 521. Thus, the terminal stages 11b and 14b can be inserted into the guide hole 521b from the opening portion 521c.

Figure 14:
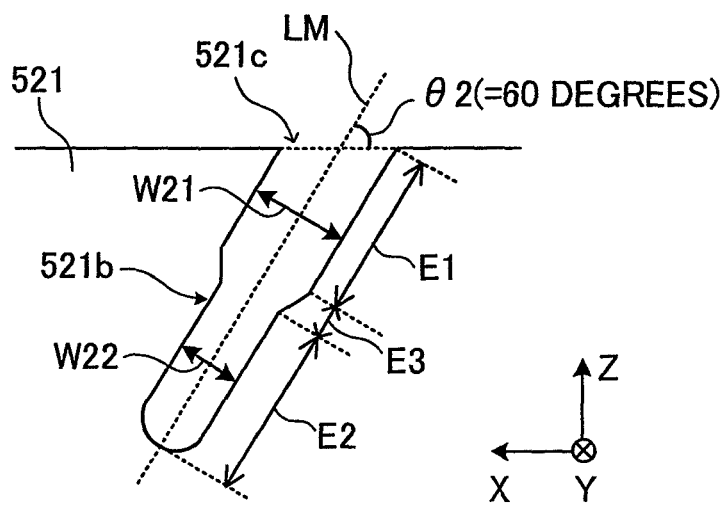
FIG. 14 is a diagram for explaining the shape of a guide hole guiding a terminal stage in Embodiment 1.

As shown in FIG. 14, the guide hole 521b has a first region (first guide region) E1, a second region (second guide region) E2, and a third region E3 located between the first region E1 and the second region E2. An angle $\theta2$ between a central line LM of the guide hole 521b and the upper end face (X-Y plane) of the first support portion 121 is set to generally 60 degrees in the X-Z plane.

A width W21 of the first region E1 is generally equal to the outer diameter R11 (see FIG. 4) of the terminal stage 11b of the first cell 11, and a width W22 of the second region E2 is generally equal to the outer diameter R21 (see FIG. 4) of the terminal stage 14b of the fourth cell 14. A width of the third region E3 seamlessly changes from the width 21 to the width W22. The second region E2 allows the entrance of the terminal stage 14b but does not allow the entrance of the terminal stage 11b.

It is thus possible to prevent the battery module 10 from being inserted into the guide hole 521b in an erroneous orientation. Specifically, the negative electrode terminal of the battery module 10 (the negative electrode terminal 14a of the cell 14) can always be located in a lower portion of the battery pack 1, and the positive electrode terminal of the battery module 10 (positive electrode terminal 11a of the cell 11) can always be located in an upper portion of the battery pack 1. As shown in FIG. 12, the two adjacent battery modules 10 in the X direction can be electrically connected accurately by using the bus bar 32.

While the present embodiment includes the guide holes 521a and 521b inclined at $\theta1$ and $\theta2$ (both are 60 degrees) with respect to the upper end face of the first support portion 121 in the X-Z plane, the present invention is not limited thereto. Specifically, the angles $\theta1$ and $\theta2$ can be set to a value in a range larger than zero and equal to or smaller than 90 degrees. When the angles $\theta1$ and $\theta2$ are set to generally 60 degrees as in the present embodiment, the cells 11 and 14 can be placed as shown in FIG. 13 to perform the temperature adjustment of the cells 11 and 14 efficiently.

While the outer diameter R11 of the terminal stage 11b associated with the positive electrode terminal 11a is larger than the outer diameter R21 of the terminal stage 14b associated with the negative electrode terminal 14a as described in FIG. 4 in the present embodiment, the present invention is not limited thereto. Specifically, the outer diameter R11 of the terminal stage 11b may be smaller than the outer diameter R21 of the terminal stage 14b. In this case, it is necessary to insert the terminal stage 11b first into the guide hole 521b.

While the two cells are inserted into the guide hole 521b in the present embodiment, the present invention is not limited thereto. Specifically, three or more cells may be inserted into the guide hole 521b. In this case, the width (corresponding to the widths W21 and W22 shown in FIG. 14) of the guide hole 521b can be varied stepwise to have as many levels as the cells. This enables the three or more cells to be inserted accurately into the guide hole 521b.

While the four cells 11 to 14 constitute the single battery module 10 in the present embodiment, the present invention is not limited thereto. Specifically, the number of cells constituting the battery module 10 can be set as appropriate. When the positive electrode terminal and the negative electrode terminal of the battery module 10 are located within the same plane as in the present embodiment, an even number of cells can be used to constitute the battery module 10.

While the battery holder 50 holds the plurality of battery modules 10 and one of the battery modules 10 is removed from or attached to the battery holder 50 in the present embodiment, the present invention is not limited thereto. Specifically, the battery holder can hold a plurality of cells and each of the cells can be removed from or attached to the battery holder.

Next, the procedure in removing the battery module 10 from the battery holder 50 will be described with reference to FIG. 15.

First, the holder cover 51 is removed from the holder body 52 to expose the opening portion (including the opening portion 521c) formed at the upper end of the holder body 52. The bus bar 41 connected to the battery module 10 to be removed is removed. Specifically, the bus bar 32 is removed from the positive electrode terminal 11a of the first cell 11, and the bus bar 32 is removed from the negative electrode terminal 14a of the fourth cell 14. As a result, the battery module 10 is in the state where it can be moved relative to the holder body 52.

In the present embodiment, since the positive electrode terminal and the negative electrode terminal of the battery module 10 are placed within the plane where the first support portion 521 is located, the bus bar 32 for electrical connection of the battery module 10 can be placed only on the side of the first support portion 521. This can easily connect the plurality of battery modules 10.

Figure 15:
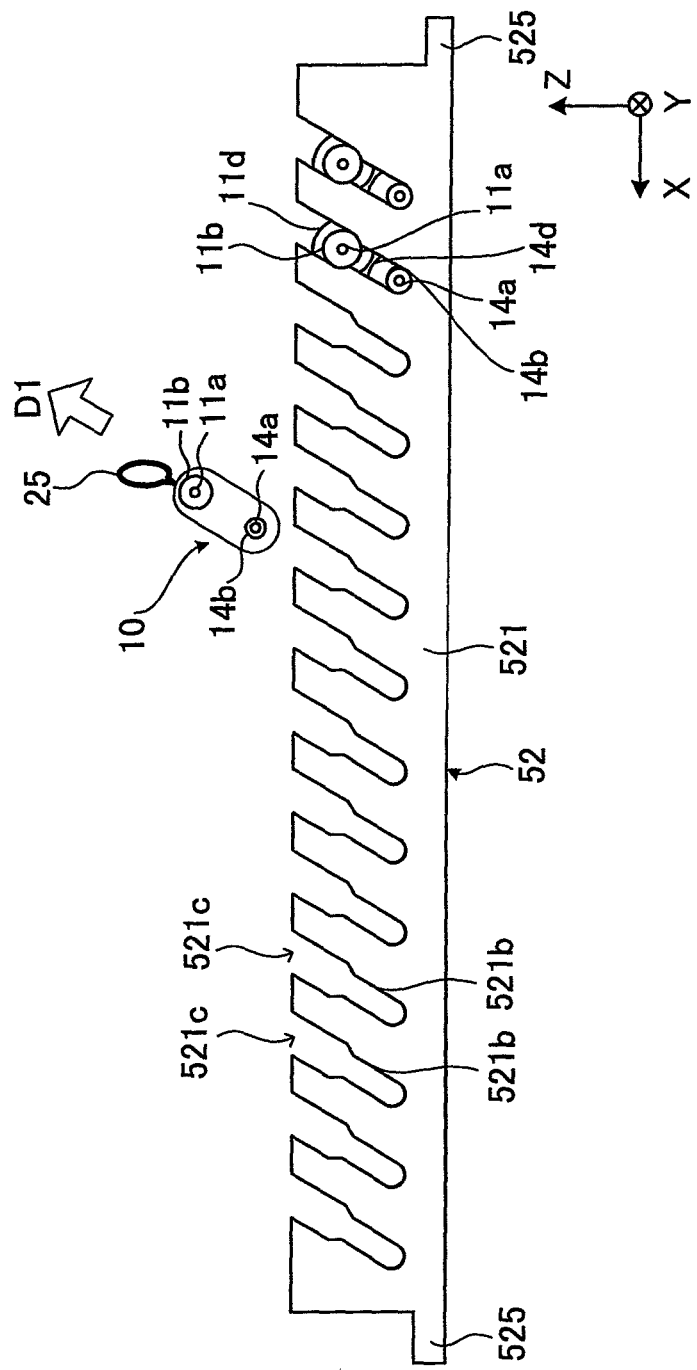
FIG. 15 is an explanatory diagram when an arbitrary battery module is removed in Embodiment 1.

After the removal of the bus bar 32, the manipulation ring 25 of the battery module 10 is pulled in the direction of an arrow D1 in FIG. 15 to enable the battery module 10 to be removed from the holder body 12. This can remove only the deteriorated battery module 10 from the battery pack 1.

The manipulation ring 25 may not be provided for the battery module 10. However, the manipulation ring 25 facilitates the removal of the battery module 10 from the holder body 52. While the manipulation ring 25 is provided for the second cap 22 as described in FIG. 2 in the present embodiment, the present invention is not limited thereto. Specifically, it is required only that the battery module 10 can be removed from the holder body 52 by pulling the manipulation ring 25. For example, the manipulation ring 25 can be fixed to any one of the cells 11 to 14.

On the other hand, for inserting the battery module 10 into the battery holder 50, the reverse operation to the removal of the battery module 10 described above may be performed. This allows the battery module 10 which is not deteriorated to be inserted into the battery pack 1 in place of the deteriorated battery module 10.

Since the removal operation of the battery module 10 can be performed from above the battery pack 1 in the present embodiment, the operation can be performed easily. Specifically, once the rear sheet 101 is taken off, the removal operation of the battery module 10 can be easily performed with the battery pack 1 mounted on the vehicle 100.

When the rear sheet 101 is realized by using a structure in which a sheet cushion and a sheet back can be turned relatively, the seat cushion can be turned toward the seat back to expose the battery pack 1 placed under the rear seat 101 in the vehicle interior. With the rear seat 101 placed on the vehicle, the removal operation of the battery module 10 can be performed.

Figure 16:
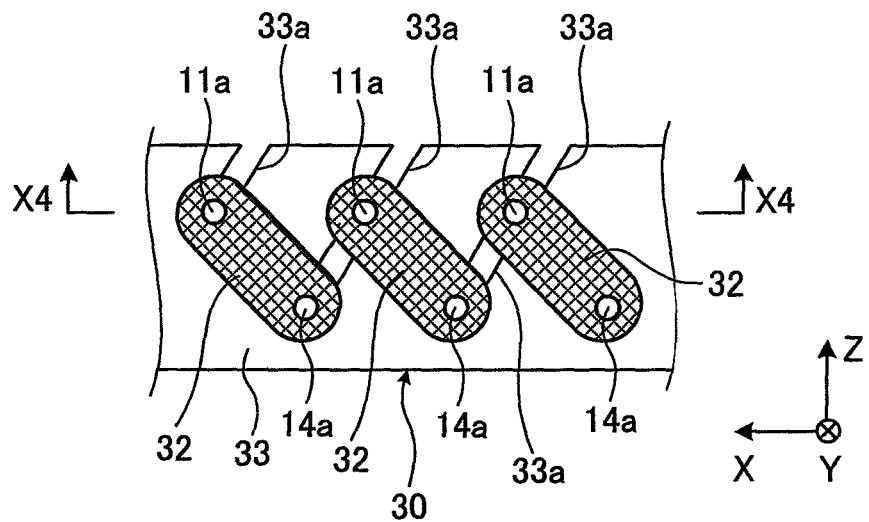
FIG. 16 is a diagram showing part of a bus bar module in a modification of Embodiment 1.

Next, a modification of the present embodiment will be described with reference to FIG. 16 and FIG. 17. FIG. 16 is a diagram showing the configuration of a portion of a bus bar module used in the modification, and FIG. 17 is a section view taken along X4-X4 in FIG. 16.

In the present modification, a bus bar module 30 including a plurality of bus bars 32 integrally formed is used to connect a plurality of battery modules 10 electrically. The use of the bus bar module 30 can facilitate the attachment operation of the bus bars 32 to the plurality of battery modules 10. The bus bar module 30 has the plurality of bus bars 32 and a substrate 33 for holding these bus bars 32. The substrate 33 is formed of an insulating material such as resin.

Figure 17:
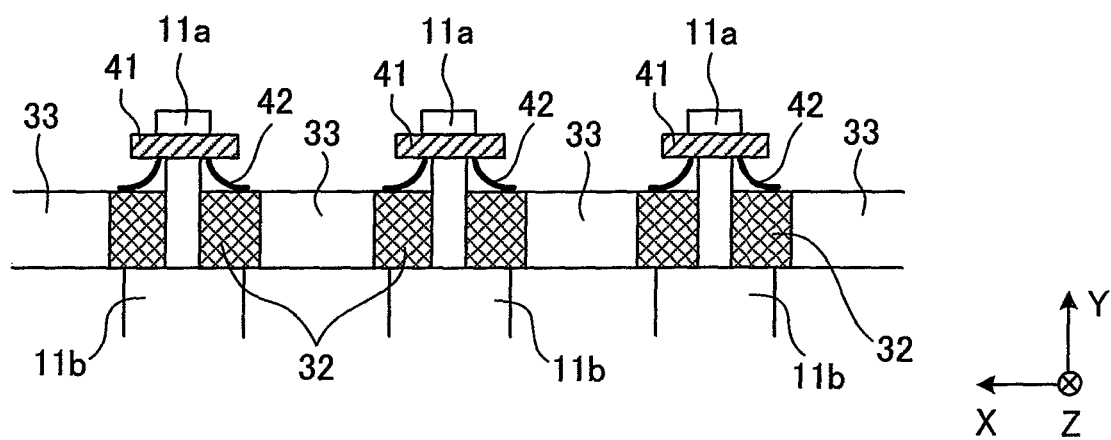
FIG. 17 is a section view taken along X4-X4 line in FIG. 16.

As shown in FIG. 17, each of the bus bars 32 is placed in the state where they are embedded in the substrate 33. The bus bars 32 and the substrate 33 are located within the same plane. Each bus bar 32 can be removed from the substrate 33.

For example, it is possible to use a structure in which the bus bar 32 is held by a hook portion (not shown) integrally formed on front and back faces of the substrate 33 such that the bus bar 32 can be removed from the substrate 33 by breaking the hook portion. It is essential only that the substrate 33 should have the structure capable of holding the plurality of bus bars 32, and the structure is not limited to that shown in FIG. 16 and FIG. 17.

The substrate 33 has a guide hole 33a formed therein for causing the positive electrode terminal 11a and the negative electrode terminal 14a to move in a predetermined direction. The guide hole 33a is inclined the same inclination angle (60 degrees) as that of the guide holes 521a and 521b formed in the holder body 52. This can prevent the positive electrode terminal 11a and the negative electrode terminal 14a from interfering with the substrate 33 of the bus bar module 30 in removing the battery module 10 from the holder body 52 to enable the easy removal of the positive electrode terminal 11a and the negative electrode terminal 14a from the substrate 33.

While the lock ring 41 and the Disc spring 42 are used to connect the bus bar 32 to the electrode terminals 11a and 14a in the present embodiment as described with reference to FIG. 5, the present invention is not limited thereto. It is required only that the bus bar 32 can be fixed to the electrode terminals 11a and 14a.

Figure 18:
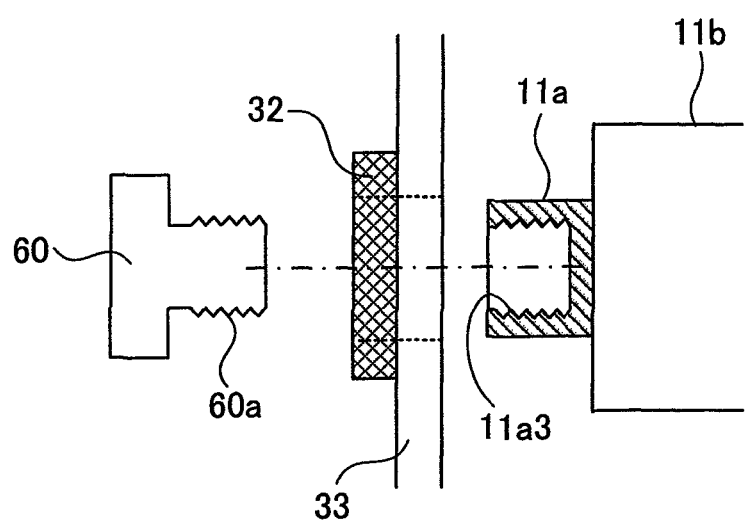
FIG. 18 is a schematic diagram showing a structure for connecting a bus bar and an electrode terminal in the modification of Embodiment 1.

A structure for connecting the bus bar and the electrode terminals (by way of example) will be described with reference to FIG. 18. In FIG. 18, members having the same functions as those of the members described in the present embodiment are designated with the same reference numerals.

In FIG. 18, a recess portion 11a3 is formed at a tip portion of the positive electrode terminal 11a. A screw portion (female screw) is formed in the inner peripheral face of the recess portion 11a3. The recess portion 11a3 is formed to mesh with a screw portion (male screw) 60a of a bolt 60. The screw portion 60a of the bolt 60 is passed through the bus bar 32 and the substrate 33 and is caused to mesh with the recess portion 11a3, so that the bus bar 32 and the substrate 33 can be fixed to the positive electrode terminal 11a.

The invention claimed is:

1. An electric storage apparatus comprising:
a plurality of electric storage components; and
a holder comprising a holder body and a holder cover, the holder holding each of the electric storage components at both end portions of each of the electric storage components in a longitudinal direction,
wherein each of the electric storage components includes electrode terminals at the both end portions, and a section shape of each of the electric storage components within an orthogonal plane orthogonal to the longitudinal direction of the electric storage component is formed in a generally circular shape,
wherein the holder body including:
a plurality of guide portions provided within the orthogonal plane and configured to move both end portions of each of the electric storage components toward a predetermined holding position; and
an opening portion formed within the orthogonal plane at an upper end of each of the guide portions and configured to insert the end portion of the electric storage component into the guide portion,
wherein the opening portion of the holder is located above the electric storage components when viewed from the longitudinal direction of the electric storage components,
the holder cover is provided over the opening portions to close the upper ends of the guide portions in a direction orthogonal to the longitudinal direction of the electric storage component,
wherein the plurality of electric storage components include first and second electric storage components each having a stage for the electrode terminal, the stages having different outer diameters, and wherein the guide portion includes a pair of first guide regions and a pair of second guide regions, the second guide regions located on the side of the first guide regions opposite to the opening portion,
wherein the stage having a larger outer diameter is arranged between the pair of the first guide regions and is in contact with the first guide region,
wherein the stage having a smaller outer diameter is arranged between the pair of the second guide regions and is in contact with the second guide region.

2. The electric storage apparatus according to claim 1, wherein the guide portions are placed side by side in a predetermined direction within the orthogonal plane, and > each of the guide portions configured to move end portions of at least two of the electric storage components toward the holding position and is inclined generally 60 degrees with respect to the predetermined direction.

3. The electric storage apparatus according to claim 1, wherein

> the first and second electric storage components are connected electrically in series at end portions on the side opposite to end portions where the stages are provided.

4. The electric storage apparatus according to claim 1, wherein the electric storage apparatus is mounted on a vehicle, and > the opening portion is provided at an end face of the holder, the end face being located on an upper side of the vehicle.

5. The electric storage apparatus according to claim 1, wherein the opening portion of the holder faces in direction orthogonal to the longitudinal direction of the electric storage component.

6. The electric storage apparatus according to claim 1, wherein the pair of the first guide regions are parallel to each other and the pair of the second guide regions are parallel to each other.

* * * * *